US006861981B2

(12) United States Patent
Park et al.

(10) Patent No.: US 6,861,981 B2
(45) Date of Patent: Mar. 1, 2005

(54) NORMALIZING APPARATUS FOR ADAPTIVE BEAMFORMING IN SMART ANTENNA RECEIVING SYSTEM

(75) Inventors: Hyung Il Park, Daejeon (KR); In Gi Lim, Daejeon (KR); Hee Bum Jung, Daejeon (KR); Jong Dae Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/703,002

(22) Filed: Nov. 5, 2003

(65) Prior Publication Data

US 2004/0100403 A1 May 27, 2004

(30) Foreign Application Priority Data

Nov. 27, 2002 (KR) .............................. 10-2002-0074353

(51) Int. Cl.[7] .............................. H01Q 3/00; G01S 3/80; G06F 17/10
(52) U.S. Cl. ...................... 342/377; 367/126; 708/322
(58) Field of Search .......................... 342/377; 367/126; 708/322; 455/303

(56) References Cited

U.S. PATENT DOCUMENTS 6,369,757 B1    4/2002  Song et al.
6,683,913 B1 *  1/2004  Kantschuk .................. 455/303
6,687,723 B1 *  2/2004  Ding ........................... 708/322
2003/0146870 A1 * 8/2003  Guo et al. .................... 342/383

FOREIGN PATENT DOCUMENTS

| KR | 2000-0065413 | 11/2000 | |
|---|---|---|---|
| KR | 2001-0010445 | 2/2001 | |
| KR | 2001-0051613 | 6/2001 | |
| KR | 2002-0067731 | 8/2002 | |
| WO | WO 9807102 A2 * | 2/1998 | ........... G06F/17/17 |

OTHER PUBLICATIONS

F. Albu et al., The Gauss–Seidel fast affine projection algorithm, IEEE Workshop on Signal Processing Systems, p. 109–114, Oct. 2002.*

A Pipeline Architecture of Quadratic Adaptive Volterra Filters Based on NLMS Algorithm, pp. II–785–II–788.

* cited by examiner

Primary Examiner—Thomas H. Tarcza
Assistant Examiner—F H Mull
(74) Attorney, Agent, or Firm—Blakely Sokoloff Taylor & Zafman

(57) ABSTRACT

Provided is a normalizing apparatus for adaptive beamforming by performing a normalizing process which uses a normalized least mean square (NLMS) algorithm that produces a weight vector for adaptive beamforming, in a smart antenna receiver. For the normalizing process, the normalizing apparatus includes a multiplication operation means that performs a multiplication operation, and a division operation means that performs a division operation using mathematic calculations based on binary logarithm principles, and using addition and subtraction operations.

9 Claims, 2 Drawing Sheets

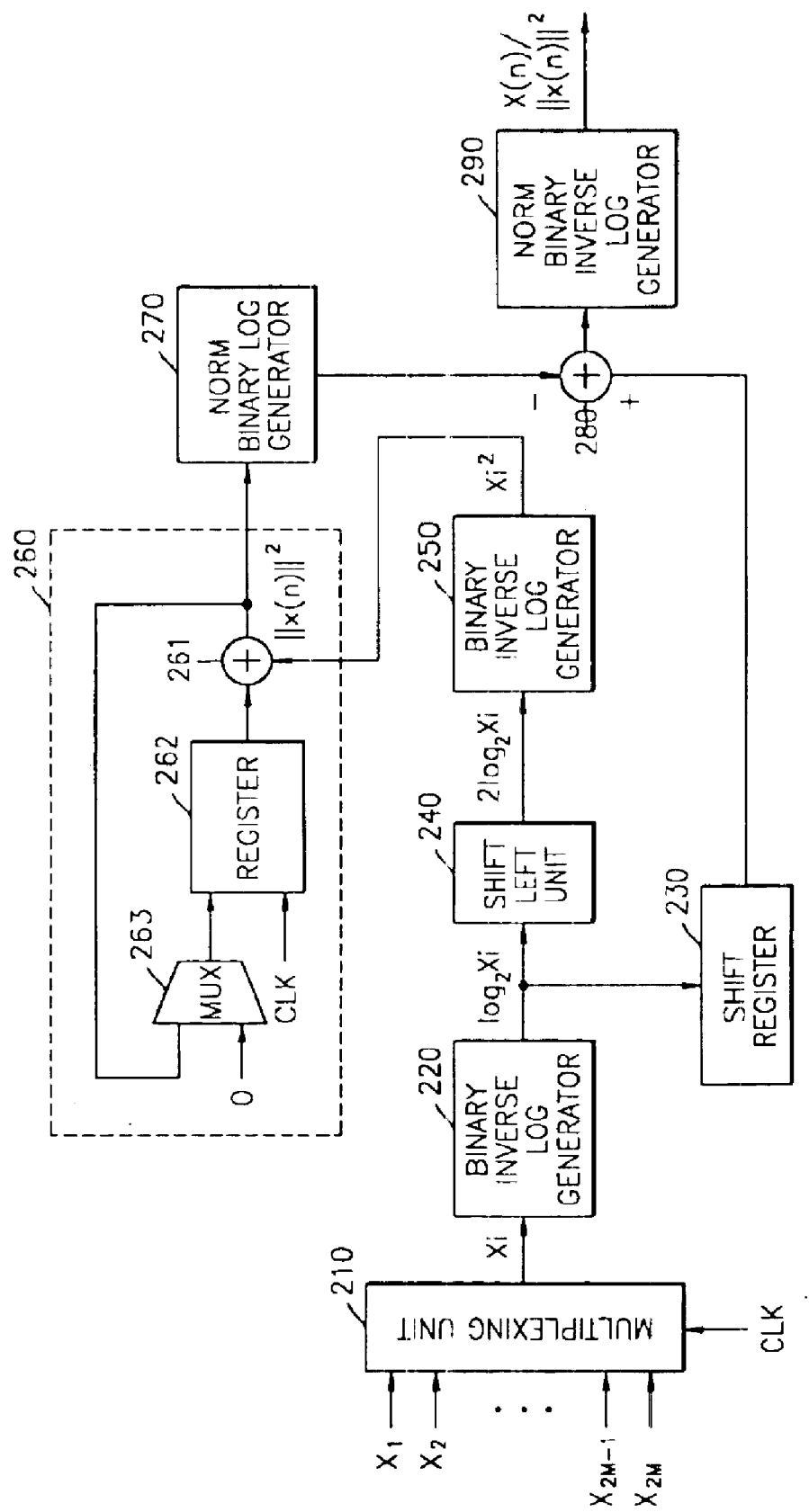

NORMALIZING APPARATUS FOR ADAPTIVE BEAMFORMING IN SMART ANTENNA RECEIVING SYSTEM

This application claims the priority of Korean Patent Application No. 2002-74353 filed on Nov. 27, 2002, in Korean Intellectual Property Office, the disclosure of which is incorporated herein in its entirety by reference.

BACKGROUND OF THE INVENTION

1. Field of the Invention

The present invention relates to a smart antenna receiving system, and more particularly, to a normalizing apparatus for adaptive beamforming in a smart antenna receiving system.

2. Description of the Related Art

When processing an individual user signal in a mobile communications system, such as a code division multiple access (CDMA) system, other user signals are considered as interfering signals. Therefore, as the number of users sharing the same frequency at a base station increases, multiple access interfering noise increases and a bit error rate of a received signal increases, thus resulting in performance deterioration of the CDMA system. In order to increase the capacity and communication quality of the CDMA system, it is essential to remove inter chip interference due to multi-path fading of an individual user signal, and multiple access interference due to multiple user signals. In general, inter chip interference can be removed using a RAKE receiver capable of separating two signals with different time delays, and multiple access interference can be removed using a smart antenna receiving system.

Smart antenna technology has been developed to cope with the limited frequency resources in a mobile communications system and the explosive increase in application for mobile users. In detail, smart antenna technology adjusts the gains and phases of signals received by antenna, using a plurality of antenna arrays, so that a base station can receive only a signal transmitted from the direction a user desires. This remarkably reduces the level of noise signals due to multiple access interference, which is caused by the signals transmitted from other directions. In this way, the performance of the system and the channel capacity of the base station can be increased.

Depending on beamforming method, the smart antenna receiving system is largely categorized into two types: a switched beam smart antenna with a fixed antenna pattern; and an adaptive beam smart antenna with a variable antenna pattern according to temperature or ambient conditions. The former one has the disadvantage of deteriorating system when a user is positioned between antenna patterns, whereas the latter one is capable of forming a beam directly toward a user. Therefore, the latter one is less affected than the former one by change in the ambient conditions.

An adaptive beamforming algorithm, which is an important technology in the smart antenna receiving system, enables estimation of a signal to be transmitted by multiplying signals received via antenna array by proper weight vectors. In particular, a normalized least mean square (NLMS) algorithm is often used to compute a weight vector. However, if a normalizing apparatus, which performs operations using the NLMS algorithm, is realized by hardware, the size of required multiplication and division operation units might be ten times more than that of a receiver. Even if this significant figure is reduced and timing is used after dividing, the size of the normalizing apparatus would still be equivalent to that of the receiver. In particular, a mobile communications system that processes signals in real-time requires a simplified NLMS. However, the inclusion of the multiplication and division operation units in the normalizing apparatus makes it almost impossible to simplify the structure of the normalizing apparatus. In addition, since clocks more than bits of dividend are required for the division operation unit, the size of the normalizing apparatus is increased and real-time processing velocity decreases due to a bottleneck phenomenon.

SUMMARY OF THE INVENTION

The present invention provides a normalizing apparatus for adaptive beamforming without using multiplication and division operation units, which reduces the size of the mobile communications system and increases the speed of processing signals in real time.

According to an aspect of the present invention, there is provided a normalizing apparatus for adaptive beamforming by performing a normalizing process which uses a normalized least mean square (NLMS) algorithm that produces a weight vector for adaptive beamforming with respect to a smart antenna receiver, the apparatus comprising a multiplication operation means that performs a multiplication operation for the normalizing process; and a division operation means that performs a division operation using mathematical calculation based on binary logarithmic principles and a subtraction operation, for the normalizing process.

The apparatus further includes a multiplexer that outputs in serial signals input from the smart antenna receiver, in synchronization with a clock signal, and inputs the signals to the multiplication operation means.

It is preferable that the multiplication operation means performs the multiplication operation using mathematical calculation based on binary logarithmic principles and an addition operation. It is preferable that the multiplication operation means comprises a binary log generator that transforms the signals, which are sequentially input from the multiplexer, into binary logarithms and outputs the binary logarithms; a shift left unit that doubles an output of the binary log generator and outputs a result; and a binary inverse log generator that calculates inverse logarithm of the result output from the shift left unit. Also, it is preferable that the apparatus further includes an accumulating unit that sequentially adds output of the binary inverse log generator and outputs it as a NORM function value.

It is preferable that the accumulating unit comprises an adder that combines a signal output from the binary inverse log generator and a specific input signal, and outputs a combination result; and a register that receives feedback of a signal output from the adder and provides the specific input signal to the adder in synchronization with a specific clock signal.

It is preferable that the apparatus further includes a shift register that temporarily stores the binary logarithms output from the binary log generator and sequentially output a stored output.

It is preferable that the division operation means comprises a NORM binary log generator that transforms the NORM function value, input from the accumulating unit, into a binary logarithm and outputs the binary logarithm; a subtractor that subtracts the binary logarithm output from the NORM binary log generator from the stored output of the shift register, and outputs a subtraction result; and a NORM binary inverse log generator that calculates binary inverse logarithm of the subtraction result and outputs a result.

It is preferable that the binary log generator and the NORM binary log generator are embodied as a lookup table (LUT) or read-only memory (ROM).

BRIEF DESCRIPTION OF THE DRAWINGS

The above and other aspects and advantages of the present invention will become more apparent by describing in detail preferred embodiments thereof with reference to the attached drawings in which:

FIG. 2 is a block diagram illustrating the structure of a normalizing apparatus capable of adaptively forming a beam, according to a preferred embodiment of the present invention.

DETAILED DESCRIPTION OF THE INVENTION

Figure 1:
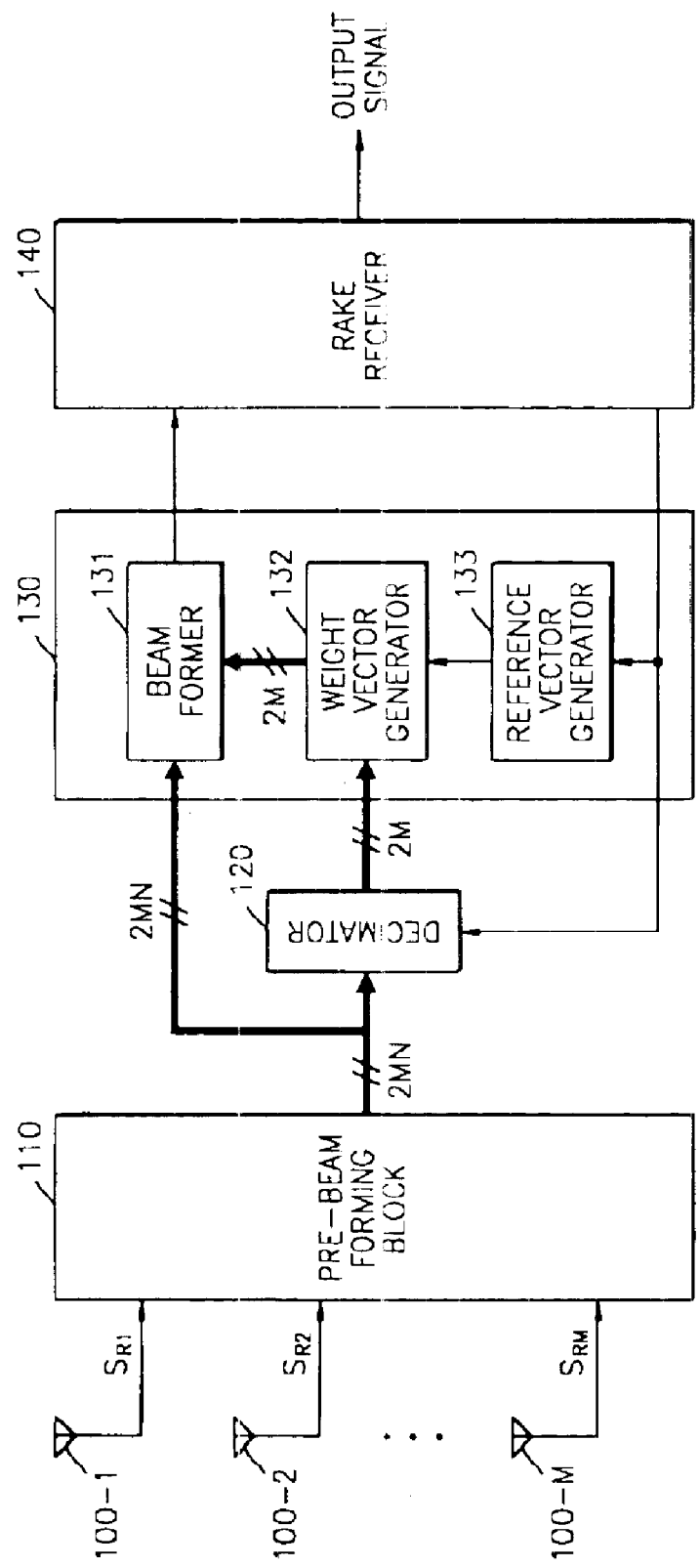
FIG. 1 is a block diagram illustrating the structure of a general smart antenna receiving system.

The present invention will now be described more fully with reference to the accompanying drawings, in which preferred embodiments of the invention are shown.

FIG. 1 is a block diagram illustrating the structure of a general smart antenna receiving system. Referring to FIG. 1, M antenna arrays 100-1, 100-2, . . . , and 100-M have the same characteristics and are arranged at predetermined intervals (M is an integer greater than 2). Symbol signals $S_{R1}$, $S_{R2}$, . . . , and, $S_{RM}$ which are received via antenna arrays 100-1, 1002, . . . , and 100-M, are analog signals, each signal including an in-phase (I) signal and a quadrature-phase (Q) signal. Therefore, the total number of received symbol signals is 2M. The 2M symbol signals are input to a pre-beamforming block 110. The pre-beamforming block 110 converts the input symbol signals from analog signals into digital signals, and performs over-sampling at a frequency higher by N times, and outputs the over sampled signals. Therefore, the total number of symbol signals output from the pre-beamforming block 110 is 2M×N. The symbol signals output from the pre-beamforming block 110 are input to a beamforming unit 130 and a decimator 120. The decimator 120 selects, as a sample, the most optimized one out of the N over-sampled symbol signals and outputs 2M optimized-symbol signals.

The beamforming unit 130 includes a beam former 131, a weight vector generator 132, and a reference vector generator 133. The beam former 131 receives 2M×N signals from the pre-beamforming block 110, receives 2M weight vectors from the weight vector generator 132, and performs beamforming. The weight vector generator 132 receives a reference vector from the reference vector generator 133 and a signal output from the decimator 120, generates a weight vector using the reference vector and the signal, and inputs the weight vector to the beam former 131. The weight vector generator 132 performs a normalizing process to produce the weight vector. The weight vector generator 132 includes a normalizing apparatus that performs the normalizing process. The reference vector generator 133 generates the reference vector and inputs it to the weight vector generator 132.

The signal output from the beam former 131 is input to a RAKE receiver 140 which demodulates and outputs the input signal. The signal output from the RAKE receiver 140 is combined with the signal output from another RAKE receiver (not shown), which demodulates a symbol signal that is processed at different signal paths, thereby restoring the original symbol signal. Meanwhile, the RAKE receiver 140 inputs timing information both to the decimator 120 and the reference vector generator 133.

FIG. 2 is a block diagram illustrating the structure of a normalizing apparatus which performs a normalizing process to produce a weight vector in the weight vector generator 132 of FIG. 1. Referring to FIG. 2, the normalizing apparatus includes a multiplexing unit 210 that receives 2M signals $X_1$, $X_2$, . . . , $X_{2M-1}$, and $X_{2M}$ from the decimator 120 of FIG. 1. The multiplexing unit 210 sequentially outputs the 2M signals $X_1$, $X_2$, . . . , $X_{2M-1}$, and $X_{2M}$ in synchronization with a clock signal input CLK. The signal $X_i$ output from the multiplexer 210 is input to a binary log generator 220. Then, the binary log generator 220 calculates and outputs the value of logarithm $\log_2 X_i$ corresponding to the signal $X_i$. The binary log generator 220 may be embodied as a lookup table (LUT) or read-only memory (ROM). The value of logarithm $\log_2 X_i$ output from the binary log generator 220 is stored both in a shift register 230 and a shift left unit 240. The shift register 230 temporarily stores the value of logarithm $\log_2 X_i$ for adjusting operation timing. The shift left unit 240 performs square operation of logarithm $\log_2 X_i$ to calculate the NORM function that is required for performing a normalizing operation. In other words, the shift left unit 240 sequentially moves input values by one bit in the left direction and the input value of logarithm $\log 2 X_i$ doubles, thus obtaining $2\log 2 X_i$.

The signal $2\log_2 X_i$ output from the shift left unit 240 is input to a binary inverse log generator 250. The binary inverse log generator 250 calculates the inverse logarithm of the input binary log signal $2\log_2 X_i$ and obtains the result signal $X_i^2$. The result signal $X_1^2$ output from the binary inverse log generator 250 is input to an accumulating unit 260.

The accumulating unit 260 includes an adder 261, a register 262, and a multiplexer 263. The adder 261 combines a value output from the register 262 and a value output from the binary inverse log generator 250, and outputs the combination result. The register 262 stores a signal input from the multiplexer 263 and outputs the signal to the adder 261 in synchronization with a clock signal CLK. The multiplexer 263 selects the output of the adder 261 or low signal 0 in order to accumulate only 2M components($x^2_{1,re}$, $x^2_{1,im}$, . . . $x^2_{M,re}$, $x^2_{M,im}$), and the output of the multiplexer 262 is stored in the register 262. Values output from the binary inverse log generator 250 are input to the accumulating unit 260 and the accumulating unit 260 outputs a NORM function value $\|x(n)\|^2$.

The NORM function value $\|x(n)\|^2$ is input to a NORM binary log generator 270 and transformed into a value of logarithm $\text{Log}_2\|x(n)\|^2$. The value of logarithm $\text{Log}_2\|x(n)\|^2$ is input to a subtractor 280. The subtractor 280 subtracts the value of logarithm $\text{Log}_2\|x(n)\|^2$ which is input from the NORM binary log generator 270, from the value of logarithm $\log_2 X_i$, which is input from the shift register 230, and outputs the subtraction result. The subtraction result output from the subtractor 280 is input to the NORM binary inverse log generator 290. The NORM binary inverse log generator 290 calculates the binary inverse logarithm of the subtraction result, which is input from the subtractor 280, and outputs the final output value $x(n)/\|x(n)\|^2$. The final output value $x(n)/\|x(n)\|^2$ and the reference vector are used to produce a weight vector in the weight vector generator 132 of FIG. 1.

The NORM function value $\|x(n)\|^2$ output from the accumulating unit 260 may be expressed as follows:

$$\|x(n)\|^2 = |x_1|^2 + |x_2|^2 + \ldots + |x_M|^2 \quad (1)$$
$$= (x_{1,re}^2 + x_{1,im}^2) + (x_{2,re}^2 + x_{2,im}^2) + \ldots + (x_{M,re}^2 + x_{M,im}^2) \in Z$$

The normalized final output value $x(n)/\|x(n)\|^2$ may be expressed using Equation (1), as follows:

$$x(n)/\|x(n)\|^2 = \begin{bmatrix} \frac{x_1}{\|x(n)\|^2} \\ \frac{x_2}{\|x(n)\|^2} \\ \ldots \\ \frac{x_M}{\|x(n)\|^2} \end{bmatrix} = \begin{bmatrix} \frac{(x_{1,re} + jx_{1,im})}{\|x(n)\|^2} \\ \frac{(x_{2,re} + jx_{2,im})}{\|x(n)\|^2} \\ \ldots \\ \frac{(x_{M,re} + jx_{M,im})}{\|x(n)\|^2} \end{bmatrix} \quad (2)$$

As shown in Equations (1) and (2), the normalizing process performed in an NLMS algorithm requires performing multiplication and division operations several times. Let us assume that the total number of antennae is eight, speed of data input is 30.72 MHz, the resolution of an input byte is 8 bits, and the beam forming operational frequency is equivalent to the a chip rate. In this case, many operation units, e.g., sixteen 8×8 multipliers, sixteen 16-bit adders, and sixteen 22/14 dividers, are required. However, a normalizing apparatus according to the present invention, which is realized by hardware using binary logarithmic and binary inverse logarithmic principles, requires only four memory components, a 16-bit adder, and a 16-bit subtractor for the normalizing process.

As described above, in the present invention, a normalizing apparatus for adaptive beamforming in a smart antenna receiving system performs a normalizing process by performing multiplication and division operations using addition and subtraction operations. For this reason, it is possible to remarkably reduce the size of hardware required for the system and increase the speed of processing signals in real-time. Accordingly, a smart antenna base station, according to the present invention, can support many more mobile users.

While this invention has been particularly shown and described with reference to preferred embodiments thereof, ft will be understood by those skilled in the art that various changes in form and details may be made therein without departing from the spirit and scope of the invention as defined by the appended claims.

What is claimed is:

1. A normalizing apparatus for adaptive beamforming by performing a normalizing process which uses a normalized least mean square (NLMS) algorithm that produces a weight vector for adaptive beamforming with respect to a smart antenna receiver, the apparatus comprising:
   a multiplication operation means that performs a multiplication operation for the normalizing process; and
   a division operation means that performs a division operation using mathematical calculation based on binary logarithmic principles and a subtraction operation, for the normalizing process.

2. The apparatus of claim 1, further comprising a multiplexer that outputs in serial signal input from the smart antenna receiver, in synchronization with a clock signal, and inputs the signals to the multiplication operation means.

3. The apparatus of claim 2, wherein the multiplication operation means performs the multiplication operation using mathematical calculation based on binary logarithmic principles and an addition operation.

4. The apparatus of claim 3, wherein the multiplication operation means comprises:
   a binary log generator that transforms the signals, which are sequentially input from the multiplexer, into binary logarithms and outputs the binary logarithms;
   a shift left unit that doubles an output of the binary log generator and outputs a result; and
   a binary inverse log generator that calculates inverse logarithm of the result output from the shift left unit.

5. The apparatus of claim 4, further comprising an accumulating unit that sequentially adds output of the binary inverse log generator and outputs it as a NORM function value.

6. The apparatus of claim 5, wherein the accumulating unit comprises:
   an adder that combines a signal output from the binary inverse log generator and a specific input signal, and outputs a combination result; and
   a register that receives feedback of a signal output from the adder and provides the specific input signal to the adder in synchronization with a specific clock signal.

7. The apparatus of claim 4, further comprising a shift register that temporarily stores the binary logarithms output from the binary log generator and sequentially output a stored output.

8. The apparatus of claim 7, wherein the division operation means comprises:
   a NORM binary log generator that transforms the NORM function value, input from the accumulating unit, into a binary logarithm and outputs the binary logarithm;
   a subtractor that subtracts the binary logarithm output from the NORM binary log generator from the stored output of the shift register, and outputs a subtraction result; and
   a NORM binary inverse log generator that calculates binary inverse logarithm of the subtraction result and outputs a result.

9. The apparatus of claim 4 or 8, wherein the binary log generator and the NORM binary log generator are embodied as a lookup table (LUT) or read-only memory (ROM).

* * * * *